(12) United States Patent
Patterson

(10) Patent No.: US 6,976,316 B1
(45) Date of Patent: Dec. 20, 2005

(54) MAGNETIC PLUMB BOB HOLDER

(76) Inventor: James R. Patterson, 6935 Cornell St., St. Louis, MO (US) 63130

( * ) Notice: Subject to any disclaimer, the term of this patent is extended or adjusted under 35 U.S.C. 154(b) by 178 days.

(21) Appl. No.: 09/747,852

(22) Filed: Dec. 22, 2000

Related U.S. Application Data

(60) Provisional application No. 60/173,098, filed on Dec. 27, 1999.

(51) Int. Cl.[7] ............................................. G01C 15/10
(52) U.S. Cl. ........................... 33/392; 33/365; 33/404; 33/370
(58) Field of Search ..................... 33/365, 392, 404, 33/347, 370, 371, 391, 407

(56) References Cited

U.S. PATENT DOCUMENTS

| | | | | |
|---|---|---|---|---|
| 4,442,610 A | * | 4/1984 | Owens, Jr. .................... | 33/392 |
| 5,163,230 A | * | 11/1992 | Gast ............................. | 33/392 |
| 5,195,248 A | * | 3/1993 | Juhasz ......................... | 33/393 |
| 5,323,539 A | * | 6/1994 | O'Neil ........................ | 33/394 |
| 5,392,522 A | * | 2/1995 | O'Neil ........................ | 33/393 |
| 5,426,860 A | * | 6/1995 | Lee et al. ..................... | 33/392 |
| 5,933,974 A | * | 8/1999 | Walters et al. ................ | 33/347 |

FOREIGN PATENT DOCUMENTS

| | | | | |
|---|---|---|---|---|
| GB | 2234067 | * | 7/1989 | .................. 33/392 |

OTHER PUBLICATIONS

Tajima®, Model PZB400, Pulmb-Rite, Plumb-Bob-Setter packaging, no date.

* cited by examiner

*Primary Examiner*—Christopher Fulton
*Assistant Examiner*—Travis Reis
(74) *Attorney, Agent, or Firm*—Edward H. Renner; Grace J. Fishel

(57) ABSTRACT

An inspection tool for measuring the true of metal door frames uses a plumb bob. The plumb bob is suspended from a holder which may be attached to a door frame by magnets in the body of the holder. The relationship of the holder dimensions models the relationship of the dimensions of a metal door frame. The point indicated by the plumb bob will have the same dimensions from the door frame if the frame is true. If the frame is not true, the point will have different measurements.

11 Claims, 2 Drawing Sheets

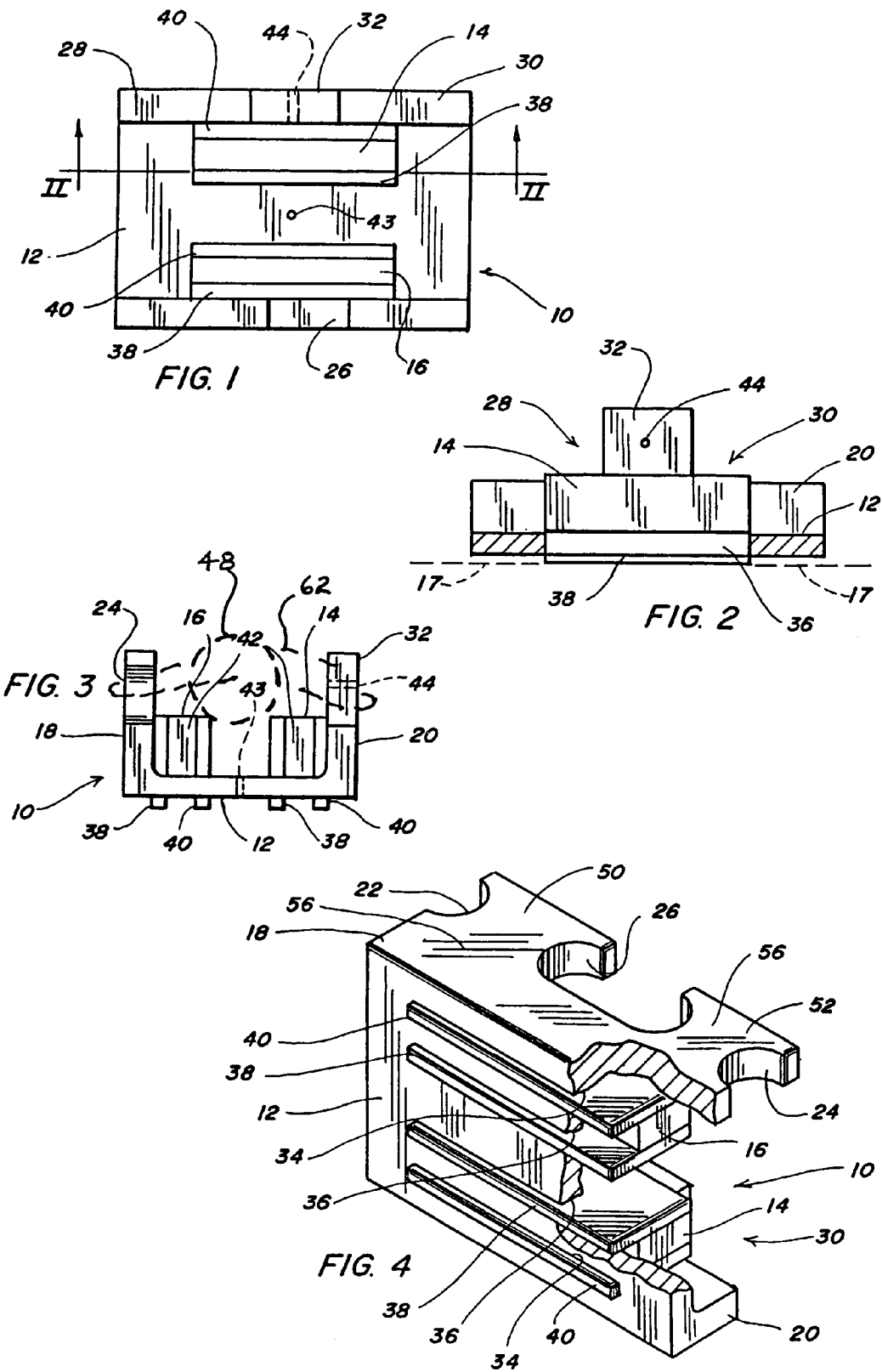

MAGNETIC PLUMB BOB HOLDER

This is a continuation of U.S. Provisional Patent Application Ser. No. 60/173,098 filed Dec. 27, 1999.

FIELD OF THE INVENTION

This invention relates to hand tools and to tools used for measuring and inspecting fabricated parts and constructions.

BACKGROUND OF THE INVENTION

The invention is particularly useful, in combination with a plumb bob, in inspecting, constructing and installing parts for accuracy. It is especially useful in checking the installation of metal door frames such as steel door frames, for true. Door frames must be installed to a high accuracy if the associated door is to be properly installed. The legs of the door frames should be vertical, that is, they should be at right angles to the horizontal plane, (the X axis and the Y axes). The vertical orientation of the door should be true to both the X and Y axes.

SUMMARY OF THE INVENTION

The tool of the invention permits an inspector to accurately check the true orientation of a steel (or other magnetic material) door frame in a few minutes using only the magnetic holder described, a plumb bob, and a ruler or the like. The magnetic holder positions the plumb bob adjacent the door frame and holds the position. The plumb bob, when so positioned, indicates a point on the horizontal plane adjacent to the base of the frame. The location of that point is an indication of the state of true of the frame. The tool may also be used on non-magnetic surfaces, as described herein.

The invention may be further understood by reference to the following Detailed Description and the attached drawings.

DESCRIPTION OF THE DRAWINGS

FIG. 1 is a top plan view of a device of the invention.

FIG. 2 is a cross sectional view of the device of the invention, taken along the plane II—II shown in FIG. 1.

FIG. 3 is a right end view of the device of the invention.

FIG. 4 is a perspective view of the device of the invention.

DESCRIPTION OF THE PREFERRED EMBODIMENTS

Figures 5, 6:
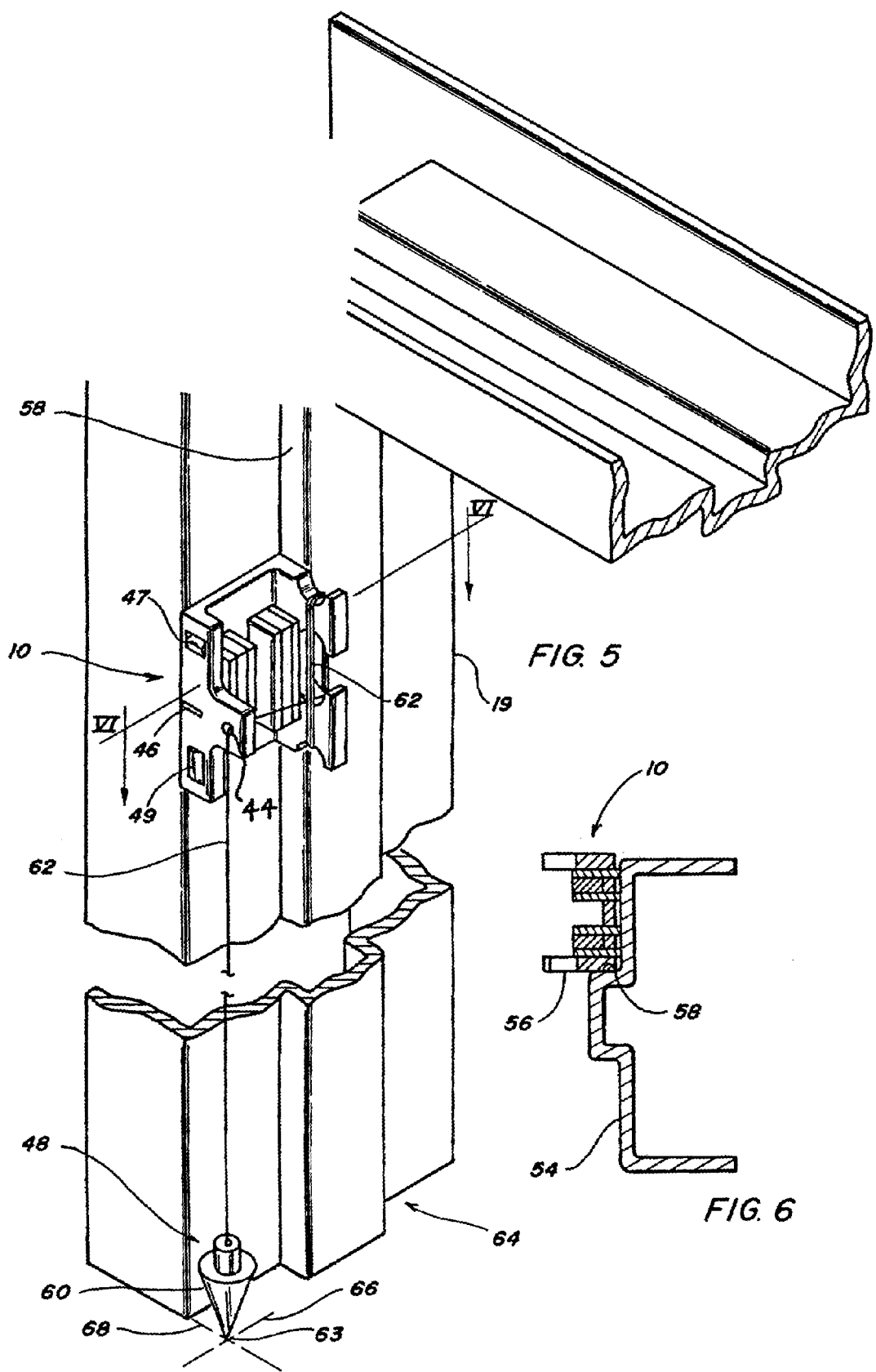
FIG. 5 is a broken perspective view of a door jamb having the device of the invention placed thereon.
FIG. 6 is a partial cross sectional view of the device of the invention, taken along the plane VI—VI shown in FIG. 5.

Referring to FIG. 1, a magnetic plumb bob holder 10 is shown. The plumb bob holder 10 has a base 12 on which two spaced bar magnets 14 and 16 are mounted, for example by an adhesive joint as is known in the art. It will be appreciated that other fabrication methods may be used including integral molding with base 12. The plumb bob holder 10 may be constructed of conventional materials, such as from metal shapes, or may be molded from plastic materials as is known in the art.

The plumb bob holder 10 has two flanges 18 and 20 extending outwardly from base 12, as shown. As shown in FIG. 4, flange 18 has recesses 22 and 24 at its opposite extremities. Flange 18 also has central recess 26, as shown in FIG. 4. Opposite flange 20 has spaced recesses 28 and 30, as shown in FIGS. 2 and 4, leaving a central extension 32 on flange 20, as shown.

As shown in FIG. 2, the spaced bar magnets 14 and 16 extend through relieved slots 34 and 36 in base 12. As shown, magnets 14 and 16 have steel side plates 38 and 40, which protect the magnetic centers 42 and act as cores to increase the strength of the magnets 14 and 16. The magnets 14 and 16 extend beyond base 12, as shown, to provide a reference plane 17 for contacting a magnetic surface, such as a portion of a steel door jamb, shown as 19 in FIG. 5. As shown in FIG. 1, base 12 may be provided with a central hole 43 which may be used to position the tool 10 on non-magnetic surfaces such as wooden door frames. For example, by attaching the tool 10 to a frame using a threaded fastener such as a wood screw or a machine screw.

As shown in FIG. 1, the central extension 32 has a bore 44 through which the string of a plumb bob may extend, as shown in FIG. 5. Extension 32 and flange 20 may have etched calibration lines, for example as shown at 46 on FIG. 5. When used with a plumb bob 48, as shown in FIG. 5, calibration line 46 indicates the horizontal plane. Optionally, the plumb bob holder 10 may have a spirit level or spirit levels, as shown in schematic as 47 and 49 in FIG. 5. These features may be attached or may be molded into the tool 10, as is known in the art.

The plumb bob holder 10 can be sized for ease in inspecting particular jobs, if desired. For example, if the distance between reference plane 17 and bore 44 is sized to be one inch and the width of base 12 is to be two inches, the plumb bob holder 10 is particularly useful in inspecting the installation of steel door frames. Other sizes and uses will be apparent to those skilled in the art. Relieved areas 22, 24, and 26 may be used for storing the string of a plumb bob, by wrapping and a plumb bob 48 may thus be stored in the space between flanges 18 and 20. In addition, the sizes of the portions 50 and 52 of flange 18 may be varied to permit adjustment of the slack portion of a plumb bob string, when using the device 10.

In operation, of the embodiment shown in FIG. 5, for example, the plumb bob holder 10 is shown mounted on a steel doorjamb 19. The magnets 14 and 16 hold the plumb bob holder 10 against the door jamb 19 with reference plane 17 adjacent to surface 54 of door jamb 19. The surface 56 of flange 18 of plumb bob holder 10 is placed against surface 58 of door jamb 19. The plumb bob holder 10 is placed to position reference plane 17 and surface 56 squarely against the door jamb 19. When so positioned, a plumb bob 48 is placed in the plumb bob holder 10 and mounted by string 62 positioned in bore 44, as shown in FIG. 5. Plumb bob 48 and string 62 provide an accurate vertical line extending to the point 63 on floor 64 beneath the opening in which jamb 19 is installed. The distance 66 between point 63 and surface 58 and the distance 68 between point 63 and surface 54 can then be measured. Distance 66 should be two inches, for example on a standard U.S. dimension frame, if the jamb is plumb. The distance 68 should be one inch, on a standard U.S. dimension frame, if the jamb is plumb. It will be appreciated by those skilled in the art that the tool 10 may be readily sized for door frames, window frames and other structures of different standards.

It will be appreciated by those skilled in the art that this description is illustrative and that various modifications of the basic principle illustrated may be made within the spirit of the invention disclosed. The invention is not to be limited by the illustrations given herein, but rather is to be limited only by the scope of the appended claims and their equivalents.

What is claimed is:

1. A tool for inspecting and gauging the accuracy of an installed steel door frame structure, the tool having means for removable attachment to a frame, the attachment means including a magnet, the tool also having means for gauging the true status of a frame in relation to three dimensional space, the gauging means including a plumb bob, the tool having means for storing the plumb bob within the tool.

2. A tool for inspecting the accuracy of installed steel door frames, the tool having a base with a magnetic attachment therein, the magnetic attachment having a terminal portion defining a first reference plane, the tool further having a first flange extending from the base, the first flange having an outer surface defining a second reference plane, the tool having a second flange extending from the base, the second flange being spaced from the first flange and being parallel to the first flange, the second flange having an aperture therethrough, the aperture accepting the string of a plumb bob, the tool cooperating with a plumb bob and string received in the aperture, when attached to an installed steel door, to gauge the accuracy and true status of the installed steel door in relation to three dimensional space.

3. The tool of claim 2 wherein the magnetic attachment of the tool includes a pair of spaced magnetic bars.

4. The tool of claim 3 wherein the terminal portions of the spaced magnetic bars define the first reference plane.

5. The tool of claim 4 wherein the magnetic bars have marginal steel plates.

6. The tool of claim 5 wherein the edges of the steel plates define the first reference plane.

7. The tool of claim 2 wherein the tool includes additional calibration means.

8. The tool of claim 2 wherein the first flange has terminal ends, the ends each having a recess therein, the first and second flanges being spaced to receive a plumb bob stored therein and the recesses receiving the string of a plumb bob wound thereon.

9. The tool of claim 2 wherein the tool has additional gauging means.

10. A tool for inspecting the accuracy of the installation of magnetic frames, the tool having a base with a magnetic attachment therein, the magnetic attachment including a pair of spaced magnetic bars, the magnetic bars having steel core plates at the sides of the magnetic bars and wherein the steel plates have terminal edges, the edges of the steel plates defining a first reference plane, the tool further having a first flange extending from the base, the first flange having an outer surface defining a second reference plane, the tool having a second flange extending from the base, the second flange being spaced from the first flange, the first and second flanges defining a space therebetween to receive a plumb bob therein, the first flange having terminal ends, the ends each having a recess therein, the recesses receiving a string of a plumb bob when wound therein, the second flange having an aperture therethrough, the aperture accepting the string of a plumb bob, the tool cooperating with a plumb bob and string received in the aperture when attached to an installed magnetic frame to gauge the accuracy and true of the installed magnetic frame in relation to three dimensional space.

11. The tool of claim 10 wherein the frame is a steel door frame.

* * * * *